G. BALMITGERE.
STEREOSCOPIC APPARATUS.
APPLICATION FILED MAY 14, 1908.

1,105,395.

Patented July 28, 1914.
2 SHEETS—SHEET 1.

WITNESSES:
W. M. Avery
J. P. Davis

INVENTOR
Georges Balmitgère
BY
ATTORNEYS

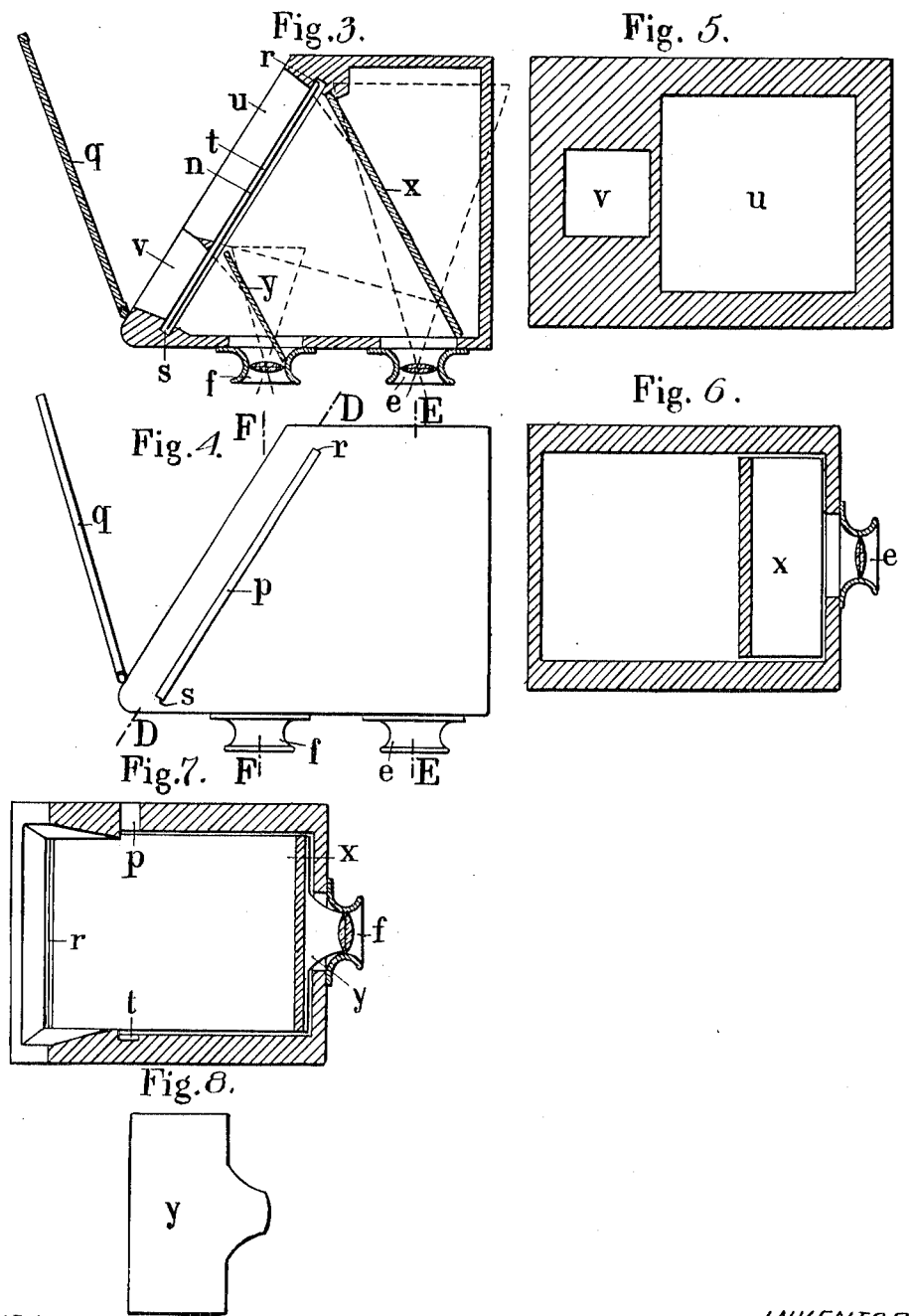

UNITED STATES PATENT OFFICE.

GEORGES BALMITGÈRE, OF PARIS, FRANCE.

STEREOSCOPIC APPARATUS.

1,105,395.  Specification of Letters Patent.  Patented July 28, 1914.

Application filed May 14, 1908. Serial No. 432,808.

*To all whom it may concern:*

Be it known that I, GEORGES BALMITGÈRE, of 2 Rue Philippe de Girard, in the city of Paris, Republic of France, have invented a Stereoscopic Apparatus, of which the following is a full, clear, and exact description.

This invention relates to stereoscopy and the principal object of the invention is to provide a novel stereoscope for reproducing stereoscopic views, so that the impression of relief can be reproduced without necessitating the material inversion of the views.

The invention consists in the novel construction and combination and arrangement of parts as is hereinafter described and pointed out in the claims.

Reference is to be had to the accompanying drawings forming a part of this specification, in which—

Figure 1:
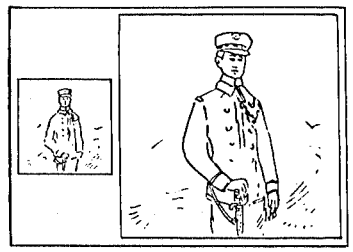
Figure 9:
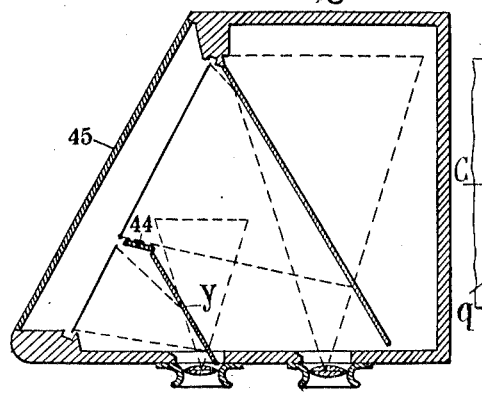
Figure 2:
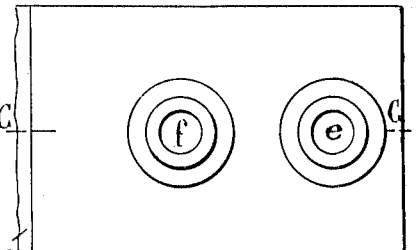

Figure 1 represents two images obtained upon a single plate, for reproduction in the stereoscope; Fig. 2 is a front view of a form of stereoscope according to the present invention; Fig. 3 is a sectional view of the same on the line C—C of Fig. 2. Fig. 4 is a plan view of the same; Fig. 5 is a sectional view on the line D—D of Fig. 4; Fig. 6 is a sectional view on the line E—E of Fig. 4; Fig. 7 is a sectional view on the line F—F of Fig. 4; Fig. 8 is a detail view of the mirror shown in Fig. 3; and Fig. 9 is a sectional view of a modified form of stereoscope.

It is universally known that to reproduce the impression of relief afforded by both eyes use is made of the stereoscope, which allows two photographs of the same subject, taken with a camera provided with two lenses, to be condensed into a single image, the aforesaid lenses being separated by a distance equal to the normal distance apart of the eyes or differing slightly from this distance. Stereoscopic cameras have been constructed in such a way that the two images were produced by two lenses having identical principal focal distances; in like manner stereoscopes have been constructed having eye pieces of the same focal length.

The present invention consists of a stereoscope arranged to reproduce views taken by a camera in which lenses are used having principal distances which are perceptibly unequal, the stereoscope being so arranged that the images will be placed at distances $x$ and $y$ from the optical centers of the eye pieces such that the ratio $\frac{x}{y}$ will be equal to the ratio between the principal focal distances of the lenses of the apparatus, the eye pieces having then either focal distances approximately equal respectively to $x$ and $y$ or greater focal distances and determined in such manner that both images will be seen in the space under the same angle and in the same plane. In particular the eye pieces of the stereoscope may have principal focal distances which are respectively equal to the principal focal distances of the lenses of the camera; these lenses may finally themselves serve as eye pieces for the stereoscope. Thus for example, let it be supposed that two photographic images of the same object are taken under the above conditions with two lenses placed a distance apart approximately equal to the distance apart normally of both eyes and having respectively principal focal distances of 5 and 10 centimeters, this last one being placed to the right of the other; if the left eye looks at the image taken with the left hand lens through a converging lens having a principal focal distance equal to 5 centimeters, it will see the object in its normal size, according to a well known principle; the right eye will likewise see this object in its normal size if it looks at the image taken with the right hand lens through a lens of 10 centimeters principal focal distance. The two images being seen at the same time of normal size will condense, giving the illusion of relief. In the above example the images are supposed to be placed at the focus of the lenses.

A stereoscope made according to this invention has various advantages, the principal of which is, if the two views necessary to produce the relief are taken on a single plate, of being able to reproduce the impression of relief without necessitating the inversion of the views (which inversion of the views is indispensable in ordinary stereoscopes) so that the negative can be seen in relief as soon as it is finished, that the taking off of the positive can be effected in a single exposure to light without necessitating the separation of the two negative images. The black and colored positives directly obtained in the dark room can be utilized immediately without any modification, the defects of register so frequent in ordinary stereograms are completely obviated, and finally these advantages can be obtained without the help of prisms or mirrors in the photographic apparatus which is a very important feature.

The two views to be reproduced in the stereoscope are of different sizes and may be obtained upon the same plate by the employment of a suitably arranged camera. When taken upon a single plate represented by way of example in Fig. 1, the images are inverted, as upon the negatives of stereoscopic apparatus of the ordinary kind; for example the smaller image taken with the left hand lens may be looked at so that it shall be on the left of the larger image, but the left hand edge of this small image represents the right hand edge of the subject photographed; it is necessary therefore in order to reëstablish the exact position while yet maintaining the small image on the left of the large one, to cause this small image to rotate in such a way as to bring to the left the right hand edge which should normally be situated there; the same operation must be performed for the large image. This turning around with the prints of ordinary stereoscopic apparatus requires the separation of the two images or the printing in two operations with special frames; it takes place on the contrary automatically, when the images are arranged as shown in Fig. 1, by the aid of the stereoscope made according to this invention having the general arrangement indicated by way of example in Figs. 2, 3, 4, 5, 6, 7. In these figures, e and f are the eye pieces, separated by a distance approximately equal to the distance apart normally of the eyes; p is an opening through which the plate n bearing the double print (positive or negative) is introduced into the stereoscope; q is a mirror intended to reflect the light onto the plate n; this mirror may be fixed to the box of the stereoscope by a hinge, as shown in Figs. 3 and 4; this mirror is however not indispensable and may be omitted; the plate n, is held in by vertical grooves r and s; it rests upon the lower panel of the stereoscope in a groove t, in such a way that the center of each of the images is situated in the horizontal plane containing the optical axes of the eye pieces, that is to say, in the plane C—C (see Fig. 2); u and v are openings corresponding to the dimensions and to the position of the two images of the double print; the heights of these openings are to each other as the bases of the openings; x and y are mirrors in which the large and the small images respectively are reflected; these mirrors are arranged in such a way that the planes containing the virtual images are perpendicular to the optical axes of the eye pieces, these optical axes being also parallel to each other; furthermore, the position of these mirrors is so combined with the position and the dimensions of the other elements of the stereoscope that: 1st, the center of each of the virtual images is approximately in alinement with the optical axis of the corresponding eye piece; 2nd, the ratio between the distances of each virtual image to the optical center of the corresponding eye piece is equal to the ratio between the principal focal distances of the lenses of the camera in which the plates were photographed. The principal focal distances of the eye pieces are then either equal respectively to the above said distances or calculated as hereinafter described.

The expression "center of an image" hereinabove used and to be used hereinafter, indicates the point of the image which was situated in the photographic apparatus, in alinement with the optical axis of the lens which served to obtain it.

The mirror y, corresponding to the small image, may be of the form shown in Fig. 8, so as to enable the edge of the eye piece f to be flush with the mirror as shown in Figs. 3 and 7.

As the eye pieces of the stereoscope shown in section in Fig. 3 must necessarily be separated by a distance approximately equal to the normal distance apart of the eyes, it is easy to understand that in order that the condensation of the two images (see Fig. 1) may be easily effected in the stereoscope, the dimensions of the different elements of the stereoscope and of the corresponding stereoscopic camera are not absolute but vary in particular with the ratio between the homologous dimensions of the two images. The dimensions of these elements may be obtained in any suitable way.

The stereoscope can show the arrangements in Fig. 9 in which it will be seen that the width of the larger image having been increased to the detriment of the small one, the width of the small mirror y has been reduced on the side of the images, so as not to prevent the right eye from viewing the part of the large image adjacent to the small one; an opaque screen 44 moreover prevents the left eye from viewing the large image; Fig. 9 shows also that a sheet of ground glass 45 has been placed behind the plate carrying the images. In the same manner as in the stereoscope shown in Fig. 3, the parts of the stereoscope shown in Fig. 9 are so arranged that the ratio between the distances of the virtual images to the optical centers of the corresponding eye pieces will be equal to the ratio between the focal distances of the lenses of the stereoscopic apparatus and according to the homologous dimensions of the images. Then, if the focal distances of the eye pieces of the stereoscope are equal respectively to the distances separating each image from the optical center of the corresponding eye piece, the virtual images will be seen as if they were placed in the space. In order to see these images as if they were placed at a nearer distance, the eye pieces will be given greater focal distances. These focal distances can be ascertained by a tentative method or by means of formulæ used in optics.

In order to compensate the difference of perspective which may occur in the case of the photography of very near objects, the mirror corresponding to the small image can be so arranged that the vertical plane containing the small virtual image will be slightly inclined relatively to the vertical plane containing the optical axes of the eye pieces so that the straight edge of the small virtual image will be a little nearer to this plane than the left edge; the same results can be obtained by modifying in a reverse manner the position of the largest mirror.

Any suitable device, (screw, tappet, etc.), can be employed for adjusting the mirrors at will from the outside of the apparatus.

As the eye pieces give a greater distortion when the focal length is short, the lens corresponding to the small image can be so chosen as to give a reverse distortion. The eye pieces of the stereoscope can be made adjustable in and out at will, the adjusting means, which may be of any suitable kind, being so arranged that the ratio between the lengths of displacement of the eye pieces will always be equal to the ratio between the homologous dimensions of the images.

In the above description it has been supposed that the smaller of the two images to be reproduced in the stereoscope was taken on the left of the larger image but it is quite evident that the reverse order may be adopted.

I claim:

1. A stereoscope for viewing views composed of two images of different sizes, the said stereoscope having eye pieces of different focal lengths, means for supporting the views in the stereoscope in an oblique position relatively to the optical axes of the eye pieces, and means for straightening the images, the said eye pieces being so arranged that the images appear of the same size and at the same distance.

2. A stereoscope for viewing the views composed of two images of different size upon a single plate, the said stereoscope having means for supporting the plate in the stereoscope, in an oblique position relatively to the optical axes of the eye pieces, and reflecting surfaces placed in reverse direction obliquely to the optical axes for straightening the images, the eye pieces being arranged so that the virtual images produced by the reflecting surfaces appear in the same size at the same distance.

3. A stereoscope for viewing views composed of two images of different size upon a single surface, the said stereoscope having eye pieces of different focal lengths, means for supporting the views in an oblique position relatively to the optical axes of the eye pieces, the stereoscope having openings in its wall corresponding to the dimensions and to the position of the two images of the view, and mirrors placed in reverse direction obliquely to the optical axes for straightening the images, the eye pieces being arranged so that the virtual images produced by the mirrors appear of the same size and at the same distance.

The foregoing specification of my method of stereoscopy and apparatus for the application of this method signed by me this first day of May 1908.

GEORGES BALMITGÈRE.

Witnesses:
 DEAN M. MASON,
 MAURICE H. PIGNET.